United States Patent [19]
Pera

[11] Patent Number: 5,069,161
[45] Date of Patent: Dec. 3, 1991

[54] TEAT CATCHER FOR A MILKING MACHINE AND A PROCESS FOR MILKING BY USING SUCH A TEAT CATCHER

[75] Inventor: Anne Pera, Emmeloord, Netherlands

[73] Assignee: Gascoigne-Melotte B.V., Emmeloord, Netherlands

[21] Appl. No.: 675,302

[22] Filed: Mar. 26, 1991

Related U.S. Application Data

[63] Continuation of Ser. No. 365,871, Jun. 14, 1989, abandoned.

[30] Foreign Application Priority Data

Jun. 15, 1988 [NL] Netherlands ............... 8801526

[51] Int. Cl.⁵ .............................................. A01J 5/04
[52] U.S. Cl. .................................. 119/14.47; 119/14.52
[58] Field of Search ............... 119/14.47, 14.48, 14.49, 119/14.50, 14.52

[56] References Cited

U.S. PATENT DOCUMENTS

| 1,089,838 | 3/1914 | Hulbert | 119/14.52 |
|---|---|---|---|
| 1,105,681 | 8/1914 | Moldenhauer | 119/14.47 |
| 1,312,941 | 8/1917 | Anderson | 119/14.52 |
| 1,365,665 | 1/1921 | Davies | 119/14.52 |
| 2,079,435 | 5/1937 | Dineson | 119/14.49 |
| 2,156,211 | 4/1939 | Meulen | 119/14.52 |
| 2,334,481 | 11/1943 | Silveira | 119/14.47 |
| 3,234,904 | 2/1906 | Jensen | 119/14.49 |
| 3,308,788 | 3/1967 | Noorlander | 119/14.49 |
| 4,280,446 | 7/1981 | Noorlander | 119/14.49 |
| 4,610,220 | 9/1986 | Goldberg et al. | 119/14.49 |
| 4,685,422 | 8/1987 | Middel | 119/14.13 |

FOREIGN PATENT DOCUMENTS

| 811315 | 8/1974 | Belgium | 119/14.47 |
|---|---|---|---|
| 167555 | 7/1985 | European Pat. Off. . | |
| 207572 | 1/1987 | European Pat. Off. . | |
| 2600290 | 7/1977 | Fed. Rep. of Germany . | |
| 244791 | 2/1968 | U.S.S.R. | 119/14.47 |
| 284236 | 3/1929 | United Kingdom . | |

*Primary Examiner*—Paul J. Hirsch
*Attorney, Agent, or Firm*—Buchanan Ingersoll

[57] ABSTRACT

A milking machine is provided with a teat cup containing a teat catcher for guiding the teat into the teat cup. The teat catcher comprises an annular flexible element with an opening the dimension of which is variable. This opening can be given a large dimension when the teat is being taken in, and a smaller dimension after the teat has been accommodated in said opening. In this way, a smaller central opening is formed directly above the teat cup. The flexible element is also movable axially in the teat cup, in order to move at least partially with the teat towards the teat cup when the teat is drawn into the teat cup under influence of a vacuum.

19 Claims, 2 Drawing Sheets

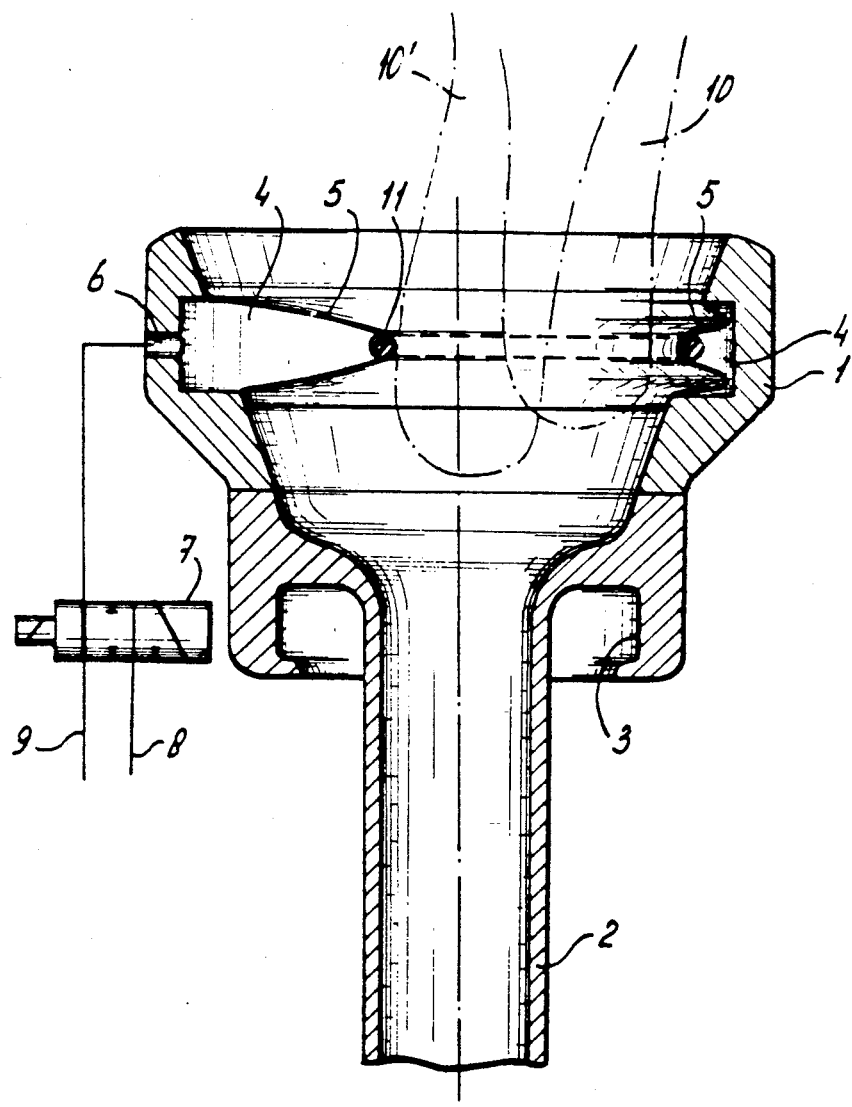

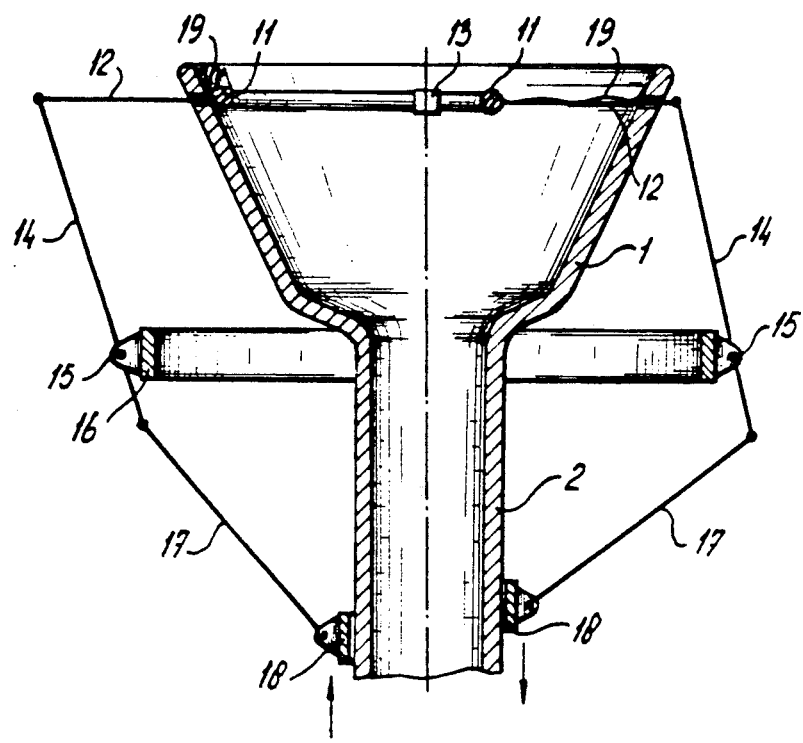
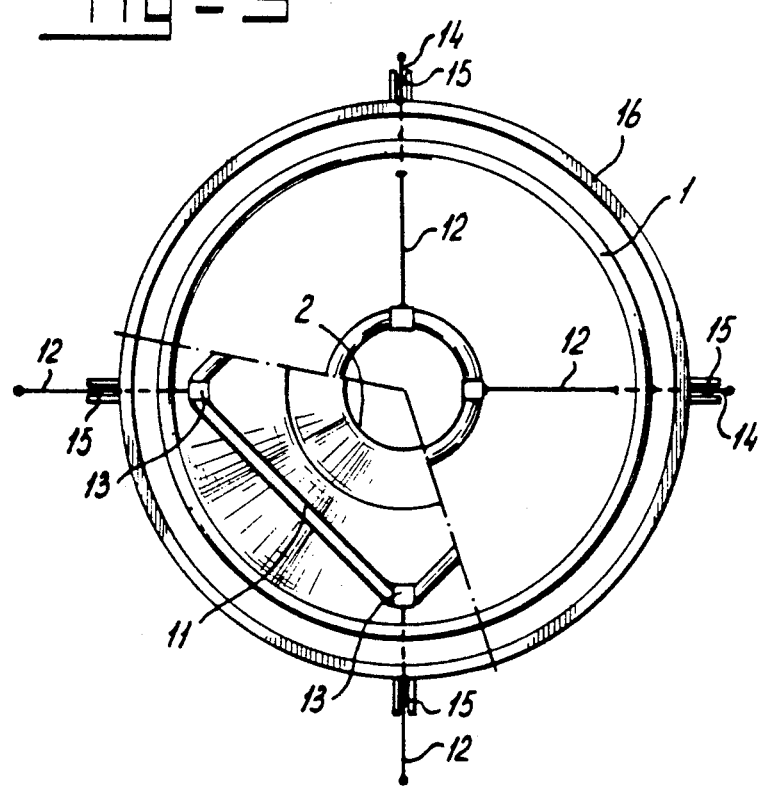

TEAT CATCHER FOR A MILKING MACHINE AND A PROCESS FOR MILKING BY USING SUCH A TEAT CATCHER

This application is a continuation of copending application Ser. No. 365,871, filed June 14, 1989 now abandoned.

The invention relates to a teat catcher, connected in sealing fashion to a teat cup placed underneath it for a milking machine, and wider than said teat cup.

Such teat catchers are known, e.g. from EP-A-167.555 AND EP-A-207.572. These teat catchers have a funnel-shaped wall, one of the objects of which is to take the teat smoothly into the teat cup beneath it.

It appears that it is generally difficult to introduce the teats of an animal being milked into the teat cups of a milking machine, and that this problem remains even when such teat catchers are used. The teats of the animals being milked, particularly those of cows, are long and limp and have a rather rough surface, so that even very slight forces in the vertical direction upwards and against the side wall of the teat push it upwards and prevent it from moving downwards, while very slight forces in the lateral direction are capable of moving the teat sideways. In the case of the known teat catchers the teat will thus not go into the teat cup if during the fitting of the teat cup it is not fairly accurately centered above it, and when the teat cup moves upwards it comes into contact with a side wall or top wall of it.

In milking machines in which the teat cups are moved mechanically in a supporting structure towards the teats, the position of the teat cups can be selected depending either on information of the teat positions of a particular animal stored in a memory or on an observation of each teat and the immediate adjustment of the position of the teat cup in a horizontal plane to the observed teat position. However, this is apparently not always an adequate solution to the above-mentioned problem, due to inaccuracies in information or observation and to the fact that it is impossible entirely to prevent any horizontal movement of animal or udder.

The object of the invention is then to improve such a teat catcher to such an extent that the problem outlined above is solved.

To this end, a teat catcher of the type mentioned in the preamble is according to the invention characterized in that an annular flexible element is provided in the teat catcher, with means for giving it a large opening while a teat of an animal being milked is being taken in, and for reducing it in diameter after the accommodation of a teat inside said opening, so that a smaller central opening in the annular element is formed, directly above the teat cup.

When the teat cup cluster is being fitted the annular element can now have a large opening, so that the teat can be taken up easily inside it in the teat catcher, even though it may not yet be accurately above the narrower teat cup which takes the teat in a close-fitting manner, and even though it may move while it is being accommodated therein, and the annular element is then reduced in diameter to enclose the teat directly above the teat cup and thus to take in into that position if it was not initially in that position inside the ring.

The vacuum in the milk pipe connected to the teat cup is now able to draw the teat further downwards. The flexible annular element is in this case preferably also movable axially in the teat cup, in order to move at least partially with the teat towards the teat cup when the teat is drawn into the teat cup under the influence of the vacuum therein.

The teat then need rub as little as possible along the annular element when entering the teat cup.

There are different possibilities for realizing the invention, and in principle three of the most preferred embodiments will be elaborated further below.

In the first place, a suitable embodiment is one in which provision is made in or against the inside wall of the teat catcher for an essentially circular chamber, the inside wall of which is flexible, and which has an inlet for a pressure medium which when fed in inflates or pumps up the flexible wall to a ring extending inwards into the catcher and having a much smaller internal diameter than the catcher, so that this wall encloses a teat accommodated in the catcher and centres it above the teat catcher, so that the vacuum in the milk discharge of the teat cup can draw the teat into the teat cup while the part of said flexible wall enclosing the teat moves at least partially towards the teat cup.

Secondly, the annular flexible element can be or comprise an elastic ring which is connected in the teat catcher to means for changing the diameter thereof.

The third possibility proposed is a combination of those first two possibilities.

The invention is furthermore related to a process for milking by using a teat catcher as described before. According to the process the milking is carried out by bringing the teat catcher near the teat above the underside thereof, reducing the diameter of the annular flexible element so that the teat is placed directly above the teat cup, drawing the teat into the teat cup by applying a vacuum, enlarging the diameter of the annular flexible element and milking by varying the vacuum in the teat cup.

The invention will now be explained in greater detail with reference to the appended drawings, in which:

FIG. 1 is a somewhat schematic axial cross-section through a teat catcher and the top part of the teat cup according to the invention fixed underneath it, in a first embodiment, with the centering means retracted on the right and in the working position on the left;

FIG. 2 is the same cross section through those parts in a different embodiment, with the centring means on the left in the retracted and on the right in the working position; and FIG. 3 is a top view of the teat catcher of FIG. 2.

The teat catcher and cup of FIG. 1 has a teat catcher 1 which on the inside tapers downwards and on the inside merges into the inside wall of an elastic teat cup lining 2, which has means 3 for being accommodated by a rigid teat cup (not shown) round it. Said teat cup can be of the usual design, with a connection for permitting pressure pulsations between cup and lining for milking. The cup can be accommodated in a carrier, e.g. of a milking machine, so that the cup can be taken mechanically into the position for milking. This cup also has the usual parts (not shown), such as a milk pipe below it which is connected to the inside of the lining, and on which a sucking action can be exerted.

Recessed in the inside wall of the teat catcher 1 is a chamber 4 which is shut off at the inside by a flexible, gastight membrane 5, e.g. of rubber. If desired, the membrane is not only flexible, but can also be stretched elastically. This chamber 4 has a passage 6 through the wall of the teat catcher, connected to a line which by means of an electromagnetically operated switch 7 provides a connection to either a line 8 by means of which the chamber 4 can be relieved of pressure medium and can be connected to vacuum, or to a line 9 through which a compressed medium, preferably air, can be admitted to the chamber 4, for example under 1.5 atmospheres.

This teat catcher works as follows: When the chamber 4 is connected to vacuum the membrane 5 is in the position shown on the right in FIG. 1, thus retracted into the space of chamber 4 recessed in the teat catcher. The teat catcher is now moved towards the teat to be milked and once this teat is reached and, partly due to the raising of the teat catcher, hangs partially into said teat catcher, switch 7 is operated to take the switch into the position shown in the drawing, in which compressed air fills the chamber 4 through the line 9 and connection 6. The membrane 5 now assumes approximately the shape shown on the left of FIG. 1, so that even if the teat is considerably outside the centre of catcher and teat cup, it takes it to said centre and encloses it. If the teat is first in position 10, this membrane thus takes the teat to position 10'.

The device is designed in such a way that in this centring position the membrane 5 encloses the teat at most in a lightly clamping manner, or just touches it all the way round. The membrane can have a reinforced surface on the inside where it touches the teat, so that it has a longer service life. In FIG. 1 the membrane contains an elastic ring 11, which can also be omitted, and which will be discussed below with reference to FIGS. 2 and 3.

The switch 7 can be operated manually or automatically when an operating person or an observation element, e.g. approach sensors on the teat catcher, establishes the presence of a teat in the teat catcher. For example, the enclosure of a teat can be established by fitting on the part of the membrane 5 enclosing the teat a vacuum line which freely extracts air, through a number of small openings round that part, from the space inside the teat catcher, but these openings are shut off completely or are greatly throttled when a teat is directly in front of or against said openings. The pressure change in said vacuum pipe indicates that a teat has been caught.

The teat catcher can also be moved further upwards during and after this centring until it is against the udder so that it can take up the teat properly. Besides, the vacuum exerted for milking on the milking pipe will exert a downward suction, via the teat cup higher up, on the teat which is precisely centered above the teat cup, a suction which draws the teat well into the teat cup, or draws the teat cup and catcher up relative thereto. This vacuum will also have the tendency to draw the membrane 5 downwards, which means that when the teat is enclosed by said membrane, the membrane helps to move the teat downwards into the teat cup. If the membrane 5 is slightly elastic, it can keep the teat well enclosed over some distance downwards during that downward movement. This can also be achieved by making the membrane 5 so large that it is still not taut in the position shown on the left of FIG. 1. It need not be elastic then, but in that case it can easily grip too tightly round the teat, which must be avoided, for example by then using a lower air pressure in the chamber 4.

The membrane 5 can be made in such a way that when it is not under pressure it goes into the retracted position by itself, shown on the right in FIG. 1. However, even then the use of vacuum described above for retracting to that position is a good idea, simply because while the teat is being drawn into the teat cup in the way described the membrane has a tendency thereafter to remain hanging down loosely along the inside wall of the catcher 1 when the pressure in chamber 4 is removed.

The pressure in chamber 4 can also be replaced by vacuum once it has been observed that the teat is enclosed and centered, and immediately after suction is exerted in the teat lining via the milk hose, thus drawing the teat into the lining, which prevents the membrane 5 from pressing the teat enclosed by it upwards on further upward movement of the teat cup. Should the teat have a tendency have to return to an eccentric position, this has no further effect, because the teat is drawn into the teat cup lining virtually at the same moment, while the teat cup rises up further.

FIGS. 2 and 3 show a different embodiment of a device according to the invention, having an elastic ring 11 in the top of the teat cup 2. It is assumed that when under no pressure, as shown on the right in FIG. 2 and on the top righthand side in FIG. 3, this ring has such a small diameter that it can then enclose a teat with slight clamping. A pulling element 12, e.g. a thin cable, is disposed on said ring at a number of places along the periphery, e.g. with thin collars 13. These cables each run through a narrow opening in the wall of the teat catcher and beyond that are each connected to a twin-arm lever 14, hingedly disposed at 15 on a ring 16 which is movable with the teat cup. The other end of each lever 14 is disposed on a hinge bar 17, at the other side hingedly disposed on a ring 18, which is moved vertically by means which are not shown, and is thus wall guided. One or two pneumatic cylinders can be connected to the ring 18 for this purpose. Four of such lever systems and gripping points on the ring 11 are shown here. There must be at least three, and there can be more than four.

This embodiment works as follows:

In the highest position of the ring 18, shown on the right, the ring 11 is in the position which centres a teat, in which position ring 11 encloses the teat in a supple manner, possibly gripping round it in lightly clamping fashion. When the ring 18 is moved downwards to the position shown on the left in FIG. 2, the hinge bars 17 move the levers 14 to the position shown on the left in FIG. 2, in which the elastic ring 11 is drawn outwards out of the position shown on the right until it is against the inside wall of the teat catcher 1. The ring will tend to run more or less straight between the collars 13, as shown bottom left in FIG. 3.

The cup 1, 2 can now be moved towards a teat of an animal for milking, and once a teat is deep enough in it, the teat centring operation is set in motion, all this in the manner described for FIG. 1. In this case this means that the ring 18 is moved upwards, so that the ring 11 can return by its own elasticity to the position shown on the right in FIG. 2, i.e. can touch and centre a teat in the catcher. If the elastic strength of the ring 11 is great enough, a single-acting pneumatic cylinder, for example, can act upon the ring 18 for the downward movement, because it returns automatically through the resilience of ring 11 to the top position on release of the piston therein.

A flexible gastight membrane 19 can be fitted between the ring 11 and the inside wall of the teat catcher 1. As in the case of FIG. 1, this produces a virtually enclosed space in the teat catcher, so that the vacuum from the milk pipe also draws the ring 11 downwards, with the result that it takes the teat with it well, and the cables 12 can be so flexible that they can follow this downward movement easily.

In the position of ring 11 enclosing a teat (on the right in FIG. 2) the membrane 12 can also still have room, i.e., is not yet taut, and/or be elastic in its plane so that this membrane can also follow said downward movement without increasing the ring 11 in diameter over the entire periphery, which would cause it to lose its grip on the teat.

The ring 11 could also actually have a large diameter when not under pressure, which has the advantage that in the position with the largest diameter (on the left in FIG. 2 and on the bottom left in FIG. 3) it can remain absolutely circular, and thus leaves a larger opening free in the teat catcher, but the diameter reduction must then take place through inward pressure, i.e. by means of pressure bars instead of by the cables 12, and the ring is going to twist too much when pressed inwards to a smaller diameter.

As pointed out above, an elastic ring 11 can also be used in the embodiment of FIG. 1. This ring is preferably placed inside the chamber wall formed by the membrane 5 and designed in such a way that in the smallest diameter position it is relived of pressure. Only a very slight air pressure need then be exerted in the chamber 4 to enclose a teat, and the ring is stretched by the vacuum in chamber 4 in such a way that it retains its circular shape and practically disappears in the wall of the teat catcher (on the right in FIG. 1). The advantage of that ring in the embodiment of FIG. 1 is also that the membrane 5 can then be selected so generously that it is not yet taut when enclosing a teat, because the ring 11 prevents the clamping on the teat from being too strong.

The embodiments of FIGS. 1, 2 and 3 could also be combined in such a way that there is then not only an inflatable bellows, but also a ring with mechanical spreading elements which then preferably run to the outside along the top or bottom of the bellows chamber.

The above-mentioned observation of the presence of a teat in the teat catcher can work in such a way that if no teat is observed, for example due to the fact that the pressure change caused by that presence in the above-mentioned observing vacuum line does not occur, the teat cup or all teat cups is (are) moved together downwards in order to repeat the filling of the teat cup cluster, possibly after correction of the horizontal position of one or more teat cups. If the observation device works only if the teat is enclosed, then the annular flexible element must, of course, be brought to the larger diameter again first. In the case of other observation devices, for example with a beam or rays or waves interrupted by the teat, the reduction of the diameter of said flexible element can be omitted until the presence of a teat in the catcher is established by it.

I claim:

1. A teat catcher connected in sealing fashion to a teat cup for a milking machine placed underneath said teat catcher, said teat catcher being wider than said teat cup, said teat cup having a lining therein, said teat catcher comprising an annular flexible element, said annular flexible element provided separate from said teat cup and situated above and at a distance from an upper edge of said lining in said teat cup; means provided in said annular flexible element for giving said annular flexible element a large opening while a teat of an animal being milked is accommodated in said teat catcher, wherein said annular flexible element having a large opening is folded against the interior of said teat catcher; and means provided in said annular flexible element for reducing the diameter of said annular flexible element to a diameter of 60% or less of the original diameter of said annular flexible element after said teat is accommodated inside said opening, wherein a smaller central opening is formed in said annular flexible element directly above said teat cup lining and said annular flexible element having a smaller central opening forms a wall generally transverse to the axis of said teat cup.

2. A teat catcher according to claim 1 wherein said annular flexible element is axially movable in said teat cup, said annular flexible element moving at least partially with said teat towards said teat cup when said teat is drawn into said teat cup under the influence of a vacuum provided in said teat cup.

3. A teat catcher according to claims 1 or 2 wherein an essentially circular chamber is provided against the inside wall of said teat catcher, said inside wall of said chamber being flexible, said chamber having an inlet for connection to a pressure medium source which inflates said flexible wall to a ring extending inwards into said teat catcher, said chamber having a smaller internal diameter than said teat catcher, wherein said flexible wall encloses said accommodated teat in said teat catcher and centers said teat above said teat cup so that a vacuum in said teat cup can draw said teat into said teat cup wherein a portion of said flexible wall enclosing said teat moves at least partially toward said teat cup.

4. A teat catcher according to claim 3 wherein said chamber has a connection to compressed air and to vacuum, said connection being controlled by a switch element which is operated after a teat is accommodated in said teat catcher, wherein said chamber is inflated by admitting compressed air and is connected to vacuum for releasing said teat.

5. A teat chamber according to claim 4 wherein a recess is provided in the inside wall of said teat catcher, said recess abridged by said flexible wall of said chamber, wherein said flexible wall is retracted into said chamber on connection to vacuum.

6. A teat catcher according to claim 3 wherein said flexible wall is folded like bellows against an inside wall of said teat catcher when said chamber is not inflated.

7. A teat catcher according to claims 1 or 2 wherein an elastic ring in said teat catcher is connected to means for altering the diameter of said teat catcher.

8. A teat catcher according to claim 7 wherein said elastic ring is fixed at at least three places on its periphery to at least one of radially acting pulling and pressure elements operable from outside said teat catcher, wherein said at least one of radially acting pulling and pressure elements changes the diameter of said ring against its elasticity.

9. A teat catcher according tot claim 8 wherein said at least one of radially pulling and pressure elements are movable axially towards and away from said teat cup.

10. A teat catcher according to claim 7 wherein said elastic ring is connected to an inside wall of said teat catcher by a gas-tight flexible membrane.

11. A teat catcher according to claim 7 wherein said elastic ring is connected to said flexible wall of said chamber.

12. A teat catcher according to claim 4 wherein said flexible wall is folded like bellows against an inside wall of said teat catcher when said chamber is not inflated.

13. A teat catcher according to claim 5 wherein said flexible wall is folded like bellows against an inside wall of said teat catcher when said chamber is not inflated.

14. A teat catcher according to claim 9 wherein said elastic ring is connected to an inside wall of said teat catcher by a gas-tight flexible membrane.

15. A teat catcher according to claim 9 wherein said elastic ring is connected to an inside wall of said teat catcher by a gas-tight flexible membrane.

16. A teat catcher according to claim 10 wherein said elastic ring is connected to said flexible wall of said chamber.

17. A teat catcher according to claim 14 wherein said elastic ring is connected to said flexible wall of said chamber.

18. A teat catcher according to claim 15 wherein said elastic ring is connected to said flexible wall of said chamber.

19. A process for milking a teat of an animal by using a teat catcher connected in sealing fashion to a teat cup placed underneath it, said teat catcher being wider than said teat cup, said process comprising the steps of:
  a. bringing said teat catcher near the teat, said teat catcher provided above the underside of said teat, an annular flexible element being provided in said teat catcher having a large opening;
  b. reducing the diameter of said annular flexible element so that said teat is placed directly above said teat cup;
  c. drawing said teat into said teat cup by applying a vacuum;
  d. enlarging the diameter of said annular flexible element; and
  e. milking said teat by varying the vacuum in said teat cup.

* * * * *

UNITED STATES PATENT AND TRADEMARK OFFICE
CERTIFICATE OF CORRECTION

PATENT NO. : 5,069,161

DATED : December 3, 1991

INVENTOR(S) : ANNE PERA

It is certified that error appears in the above-identified patent and that said Letters Patent is hereby corrected as shown below:

On the title page: [56]

References Cited change "3,234,904 2/1906" to --3,234,906 2/1966--.

Column 5, line 48, change "filling" to --fitting--.

Column 6, line 41, claim 5, change "chamber" to --catcher--.

Column 6, line 60, claim 9, change "tot" to --to--.

Column 7, line 7, claim 14, change "9" to --8--.

Signed and Sealed this

Ninth Day of March, 1993

Attest:

STEPHEN G. KUNIN

*Attesting Officer*   *Acting Commissioner of Patents and Trademarks*